United States Patent
Huang (10) Patent No.: US 11,431,821 B2
(45) Date of Patent: Aug. 30, 2022

(54) METHOD AND DEVICE FOR MONITORING DOWNTIME OF TARGET MACHINE, AND COMPUTER READABLE STORAGE MEDIUM

(71) Applicants: CHUZHOU HKC OPTOELECTRONICS TECHNOLOGY CO., LTD., Anhui (CN); HKC CORPORATION LIMITED, Guangdong (CN)

(72) Inventor: Chao Huang, Anhui (CN)

(73) Assignees: CHUZHOU HKC OPTOELECTRONICS TECHNOLOGY CO., LTD., Chuzhou (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/160,704

(22) Filed: Jan. 28, 2021

(65) Prior Publication Data

US 2022/0038552 A1 Feb. 3, 2022

(30) Foreign Application Priority Data

Jul. 28, 2020 (CN) .......................... 202010747621.1

(51) Int. Cl.
- *H04L 67/303* (2022.01)
- *H04L 67/101* (2022.01)
- *H04L 67/104* (2022.01)
- *H04L 67/306* (2022.01)
- *H04L 67/00* (2022.01)

(52) U.S. Cl.
CPC .......... *H04L 67/303* (2013.01); *H04L 67/101* (2013.01); *H04L 67/1044* (2013.01); *H04L 67/306* (2013.01); *H04L 67/34* (2013.01)

(58) Field of Classification Search
CPC . H04L 67/303; H04L 67/101; H04L 67/1044; H04L 67/34
See application file for complete search history.

(56) References Cited

U.S. PATENT DOCUMENTS

| | | | |
|---|---|---|---|
| 2015/0161835 A1* | 6/2015 | Jablokov | G08C 17/02 340/5.61 |
| 2021/0021460 A1* | 1/2021 | Sun | H04L 41/0672 |

FOREIGN PATENT DOCUMENTS

| | | |
|---|---|---|
| CN | 105139152 A | 12/2015 |
| CN | 107291044 A | 10/2017 |
| CN | 207407931 U | 5/2018 |
| CN | 109639490 A | 4/2019 |

OTHER PUBLICATIONS

Chinese Office Action dated Feb. 11, 2022, for Wheatco Phototechnology Co., Ltd., Wheatco, Chinese Application No. 202010747621.1, filed Jul. 28, 2020.

* cited by examiner

*Primary Examiner* — Suraj M Joshi
(74) *Attorney, Agent, or Firm* — Law Offices of Albert Wai-Kit Chan, PLLC (57) ABSTRACT

Disclosed are a method and a device for monitoring downtime of a target machine, and a computer readable storage medium. The method includes the following operations: receiving operating state information of the target machine in real time; determining whether the target machine is down according to the operating state information; and sending downtime prompt information to a mobile terminal account of a person responsible for the target machine when the target machine is down.

17 Claims, 9 Drawing Sheets

METHOD AND DEVICE FOR MONITORING DOWNTIME OF TARGET MACHINE, AND COMPUTER READABLE STORAGE MEDIUM

CROSS-REFERENCE TO RELATED APPLICATIONS

This application claims priority to Chinese Application No. 202010747621.1, filed on Jul. 28, 2020, the entire disclosure of which is incorporated herein by reference.

TECHNICAL FIELD

The present disclosure relates to the technical field of target machine monitoring, in particular to a method and a device for monitoring downtime of a target machine, and a computer readable storage medium.

BACKGROUND

A target machine equipment, such as the target machine equipment for manufacturing a display panel, may be down due to unexpected failures. After the target machine is down, it can only be manually reported to the supervisor or responsible person of the target machine, causing that the report is not timely, the target machine cannot be repaired or restarted in time, resulting in a decrease in the overall production efficiency of the target machine.

SUMMARY

The present disclosure provides a method for monitoring downtime of a target machine, including the following operations:

receiving operating state information of the target machine in real time;

determining whether the target machine is down according to the operating state information; and sending downtime prompt information to a mobile terminal account of a person responsible for the target machine when the target machine is down.

In an embodiment, the operation of determining whether the target machine is down according to the operating state information includes:

obtaining an operating power of the target machine according to the operating state information; and determining that the target machine is down when the operating power is beyond a preset range.

In an embodiment, the operation of sending downtime prompt information to a mobile terminal account of a person responsible for the target machine when the target machine is down includes:

obtaining identification information of the target machine according to the operating state information;

obtaining the mobile terminal account of the person responsible for the target machine according to a preset mapping relationship between the identification information of the target machine and the mobile terminal account of the person; and sending the downtime prompt information to the mobile terminal account of the person responsible for the target machine.

In an embodiment, the operation of sending downtime prompt information to a mobile terminal account of a person responsible for the target machine when the target machine is down includes:

obtaining a downtime duration of the target machine according to the operating state information;

obtaining the mobile terminal account of the person responsible for the target machine according to a preset mapping relationship between the downtime duration and the mobile terminal account of the person; and sending the downtime prompt information to the mobile terminal account of the person responsible for the target machine.

In an embodiment, the operation of sending downtime prompt information to a mobile terminal account of a person responsible for the target machine when the target machine is down includes:

obtaining identification information and a downtime duration of the target machine according to the operating state information;

obtaining the mobile terminal account of the person responsible for the target machine according to a preset mapping relationship between the identification information, the downtime duration of the target machine and the mobile terminal account of the person; and sending the downtime prompt information to the mobile terminal account of the person responsible for the target machine.

In an embodiment, the operation of sending downtime prompt information to a mobile terminal account of a person responsible for the target machine when the target machine is down includes:

obtaining a downtime duration of the target machine according to the operating state information;

determining a sending frequency of the downtime prompt information according to an interval of the downtime duration; and sending the downtime prompt information to the mobile terminal account of the person responsible for the target machine according to the sending frequency.

In an embodiment, after the operation of sending downtime prompt information to a mobile terminal account of a person responsible for the target machine when the target machine is down, the method further includes:

receiving a viewing request for viewing the operating state information sent by the mobile terminal, the viewing request including authority information of a user; and returning a viewing interface of the operating state information to the mobile terminal in response to a determination that the user corresponding to the authority information has viewing authority.

In an embodiment, after the operation of returning a viewing interface of the operating state information to the mobile terminal in response to a determination that the user corresponding to the authority information has viewing authority, the method further includes:

receiving a maintenance instruction or a restart instruction sent by the mobile terminal account based on the viewing interface of the operating state information;

sending the maintenance instruction to the target machine to remind a maintenance personnel to perform maintenance; or sending the restart instruction to the target machine to control the target machine to restart.

Besides, in order to achieve the above objective, the present disclosure further provides a device for monitoring downtime of a target machine, the device includes a memory, a processor, a program for monitoring downtime of the target machine stored in the memory and executed by the processor, the program, when executed by the processor, performs the operations of the method for monitoring downtime of a target machine as described above.

In addition, in order to achieve the above objective, the present disclosure further provides a computer readable storage medium, the computer readable storage medium stores a program for monitoring downtime of a target machine, the program, when executed by a processor, performs the operations of the method for monitoring downtime of a target machine as described above.

In the present disclosure, operating state information of the target machine in real time is received; whether the target machine is down according to the operating state information is determined; and downtime prompt information is sent to a mobile terminal account of a person responsible for the target machine when the target machine is down, such that after sending the downtime prompt message to the mobile terminal account of the person responsible for the target machine, the person responsible for the target machine can view the downtime prompt information in time, so as to timely remind the person responsible for the target machine that the target machine is down, so that the person responsible for the target machine can handle it in time.

The realization of the objective, functional characteristics, and advantages of the present disclosure are further described with reference to the accompanying drawings.

DETAILED DESCRIPTION OF THE EMBODIMENTS

It should be understood that the specific embodiments described herein are only used to explain the present disclosure, but not to limit the present disclosure.

A solution of the embodiments of the present disclosure is:

receiving operating state information of the target machine in real time;

determining whether the target machine is down according to the operating state information; and sending downtime prompt information to a mobile terminal account of a person responsible for the target machine when the target machine is down.

Nowadays, after the target machine is down, it can only be manually reported to the supervisor or responsible person of the target machine, causing that the report is not timely, the target machine cannot be repaired or restarted in time, resulting in a decrease in the overall production efficiency of the target machine.

In the present disclosure, operating state information of the target machine in real time is received; whether the target machine is down according to the operating state information is determined; and downtime prompt information is sent to a mobile terminal account of a person responsible for the target machine when the target machine is down, such that after sending the downtime prompt message to the mobile terminal account of the person responsible for the target machine, the person responsible for the target machine can view the downtime prompt information in time, so as to timely remind the person responsible for the target machine that the target machine is down, so that the person responsible for the target machine can handle it in time.

Figure 1:
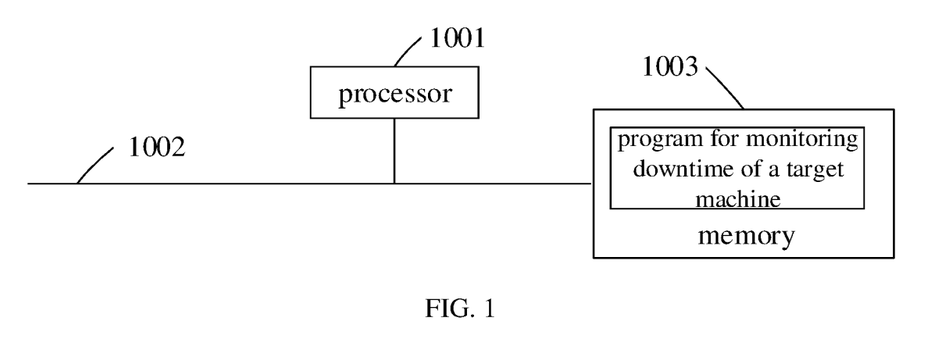
FIG. 1 is a schematic structural diagram of a terminal of a hardware operating environment according to an embodiment of the present disclosure.

As shown in FIG. 1, FIG. 1 is a schematic structural diagram of a terminal of a hardware operating environment according to an embodiment of the present disclosure.

In an embodiment of the present disclosure, the terminal may be a PC, or a mobile terminal device with a display function, such as a smart phone, a tablet computer, or a portable computer.

As shown in FIG. 1, the terminal may include a processor 1001, such as a CPU, a memory 1003, and a communication bus 1002. The communication bus 1002 is used to implement connection and communication between these components. The memory 1003 may be a high-speed random access memory (RAM) or a non-volatile memory, such as a magnetic disk memory. The memory 1003 may optionally be a storage device independent of the foregoing processor 1001.

Those skilled in the art should understand that the terminal structure shown in FIG. 1 does not constitute a limitation on the terminal, and may include more or fewer components, a combination of some components, or differently arranged components than shown in the figure.

As shown in FIG. 1, the memory 1003 as a computer storage medium may include an operating system, a network communication module, a user interface module, and a program for monitoring downtime of a target machine.

In the terminal shown in FIG. 1, the processor 1001 may call the program for monitoring downtime of the target machine stored in the memory 1003 and perform the following operations:

receiving operating state information of the target machine in real time;

determining whether the target machine is down according to the operating state information; and sending downtime prompt information to a mobile terminal account of a person responsible for the target machine when the target machine is down.

Further, the processor 1001 may call the program for monitoring downtime of the target machine stored in the memory 1003 and further perform the following operations:

obtaining an operating power of the target machine according to the operating state information; and determining that the target machine is down when the operating power is beyond a preset range.

Further, the processor 1001 may call the program for monitoring downtime of the target machine stored in the memory 1003 and further perform the following operations:

obtaining identification information of the target machine according to the operating state information;

obtaining the mobile terminal account of the person responsible for the target machine according to a preset mapping relationship between the identification information of the target machine and the mobile terminal account of the person; and sending the downtime prompt information to the mobile terminal account of the person responsible for the target machine.

Further, the processor 1001 may call the program for monitoring downtime of the target machine stored in the memory 1003 and further perform the following operations:

obtaining a downtime duration of the target machine according to the operating state information;

obtaining the mobile terminal account of the person responsible for the target machine according to a preset mapping relationship between the downtime duration and the mobile terminal account of the person; and sending the downtime prompt information to the mobile terminal account of the person responsible for the target machine.

Further, the processor 1001 may call the program for monitoring downtime of the target machine stored in the memory 1003 and further perform the following operations:

obtaining identification information and a downtime duration of the target machine according to the operating state information;

obtaining the mobile terminal account of the person responsible for the target machine according to a preset mapping relationship between the identification information, the downtime duration of the target machine and the mobile terminal account of the person; and sending the downtime prompt information to the mobile terminal account of the person responsible for the target machine.

Further, the processor 1001 may call the program for monitoring downtime of the target machine stored in the memory 1003 and further perform the following operations:

obtaining a downtime duration of the target machine according to the operating state information;

determining a sending frequency of the downtime prompt information according to an interval of the downtime duration; and sending the downtime prompt information to the mobile terminal account of the person responsible for the target machine according to the sending frequency.

Further, the processor 1001 may call the program for monitoring downtime of the target machine stored in the memory 1003 and further perform the following operations:

receiving a viewing request for viewing the operating state information sent by the mobile terminal, the viewing request including authority information of a user; and returning a viewing interface of the operating state information to the mobile terminal in response to a determination that the user corresponding to the authority information has viewing authority.

Further, the processor 1001 may call the program for monitoring downtime of the target machine stored in the memory 1003 and further perform the following operations:

receiving a maintenance instruction or a restart instruction sent by the mobile terminal account based on the viewing interface of the operating state information;

sending the maintenance instruction to the target machine to remind maintenance personnel to perform maintenance; or sending the restart instruction to the target machine to control the target machine to restart.

Figure 2:
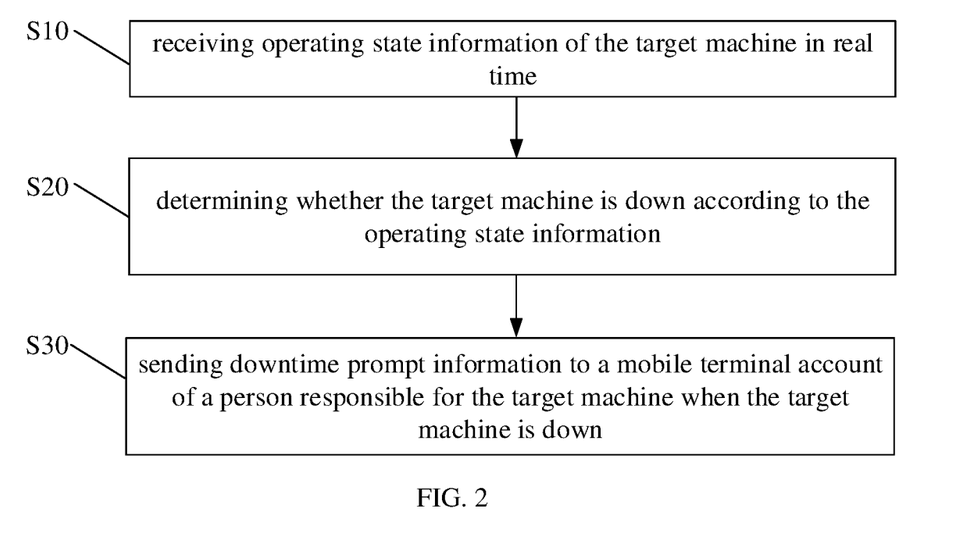
FIG. 2 is a schematic flowchart of a method for monitoring downtime of a target machine according to an embodiment of the present disclosure.

As shown in FIG. 2, in an embodiment, a method for monitoring downtime of a target machine of the present disclosure includes the following operations:

Operation S10, receiving operating state information of the target machine in real time.

In this embodiment, the target machine has a communication function and can upload its own operating state information to the server in real time, so that the server can receive the operating state information of the target machine in real time. Alternatively, the target machine is additionally equipped with a monitoring terminal such as a personal computer, the monitoring terminal monitors the target machine in real time, collects the operating state information of the target machine in real time, and sends the operating state to the server in real time. Or, the monitoring terminal collects the operating state information of the target machine and saves it locally, and then sends the locally stored operating state information to the server, such that the server can receive the operating state information of the target machine.

The operating state information includes, but is not limited to, the target machine on/off time, operating power, operating mode, number of products, production yield, modification time of production parameters, and modified production parameters, etc. Different types of target machines may have different production parameters, and this embodiment does not limit the operating state information of the target machine.

Operation S20, determining whether the target machine is down according to the operating state information.

In this embodiment, when the target machine is working normally, its operating power is basically maintained within the rated range. Even if the operating power has a small range of fluctuations due to other reasons, it will not exceed the rated range. Therefore, when the operating power is not within the rated range, for example, the operating power suddenly drops to 0, it can be determined that the target machine may be down. It should be understood that other methods can also be used to determine whether the target machine is down. For example, when the infrared sensor detects the accumulation of production materials, it is determined that the target machine is down.

It can be understood that, in this embodiment, whether the target machine is down is determined according to the operating state information, and a time period for the determination is the time period during which the target machine is normally working, such as 9 am to 12 noon, 2 pm to 6 pm. When the current time is not within the specified time period, it is not determined whether the target machine is down, so as to avoid misjudgment when the target machine is normally shut down.

Operation S30, sending downtime prompt information to a mobile terminal account of a person responsible for the target machine when the target machine is down.

In this embodiment, the downtime prompt information may include the location of the target machine, the target machine label, the time when the target machine started to go down, the person responsible for the target machine, and the possible reason of the target machine downtime, etc. The downtime prompt information may be sent to the mobile terminal account of the responsible person in the form of SMS, email, video, etc. The mobile terminal account can be, for example, a social account, a mobile phone number, a unique personal account used for internal communication within the enterprise, etc. The mobile terminal account is logged on a mobile terminal. However, users' mobile terminals such as mobile phones and tablet computers are generally carried with them. After sending the downtime prompt information to the mobile terminal account of the person responsible for the target machine, the person responsible for the target machine can view the downtime prompt information in time. Therefore, the person responsible for the target machine is reminded in time that the target machine is down, so that the person responsible for the target machine can deal with it in time.

Figure 3:
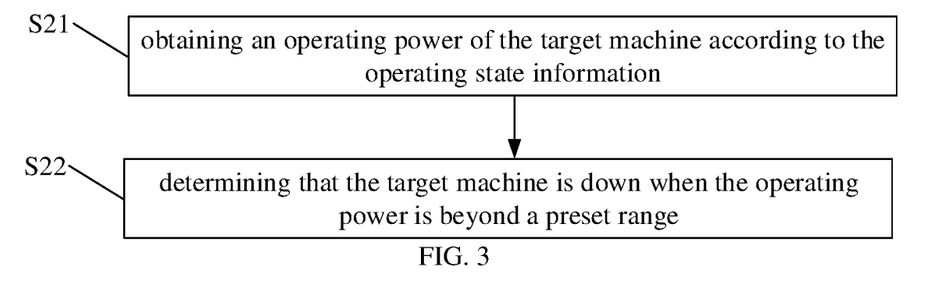
FIG. 3 is a detailed flowchart of operation S20 of the method for monitoring downtime of a target machine according to an embodiment of the present disclosure.

As shown in FIG. 3, in an embodiment, the operation S20 includes:

Operation S21, obtaining an operating power of the target machine according to the operating state information; and Operation S22, determining that the target machine is down when the operating power is beyond a preset range.

In this embodiment, when the target machine is working normally, its operating power is basically maintained within the rated range. Even if the operating power has a small range of fluctuations due to other reasons, it will not exceed the rated range. Therefore, when the operating power is not within the rated range, for example, the operating power suddenly drops to 0, it can be determined that the target machine may be down. It should be understood that other methods can also be used to determine whether the target machine is down. For example, when the infrared sensor detects the accumulation of production materials, it is determined that the target machine is down. For another example, the rotation speed sensor determines that the target machine may be down when the rotating part of the target machine, such as a motor, rotates abnormally. It can be understood that, when determining whether the target machine is down, multiple conditions can be combined for the determination. For example, when the operating power of the target machine is 0, the infrared sensor detects the accumulation of production materials, and the rotation speed sensor detects abnormal rotation of the rotating parts of the target machine, it is determined that the target machine is down.

It can be understood that, in this embodiment, whether the target machine is down is determined according to the operating state information, and a time period for the determination is the time period during which the target machine is normally working, such as 9 am to 12 noon, 2 pm to 6 pm. When the current time is not within the specified time period, it is not determined whether the target machine is down, so as to avoid misjudgment when the target machine is normally shut down.

Figure 4:
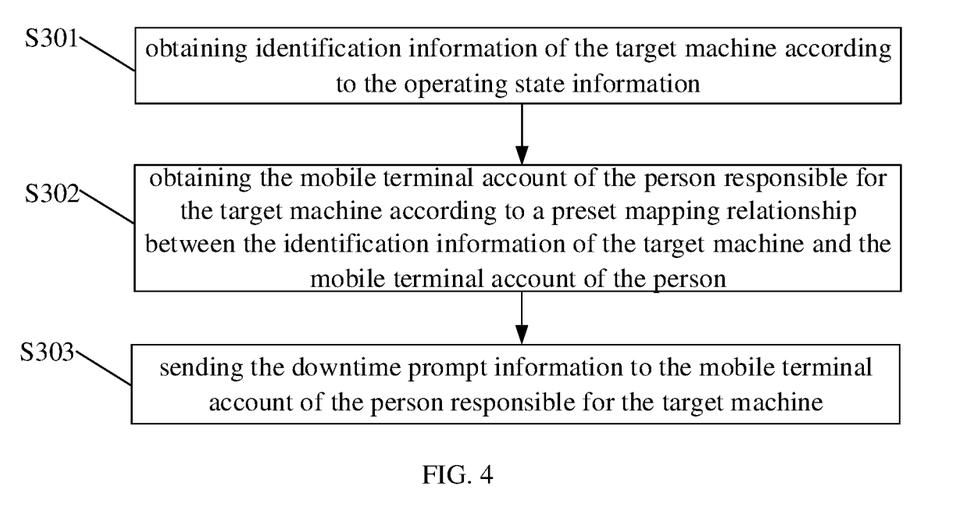
FIG. 4 is a detailed flowchart of operation S30 of the method for monitoring downtime of a target machine according to an embodiment of the present disclosure.

As shown in FIG. 4, in an embodiment, the operation S30 includes:

Operation S301, obtaining identification information of the target machine according to the operating state information;

Operation S302, obtaining the mobile terminal account of the person responsible for the target machine according to a preset mapping relationship between the identification information of the target machine and the mobile terminal account of the person; and Operation S303, sending the downtime prompt information to the mobile terminal account of the person responsible for the target machine.

In this embodiment, each target machine has identification information for uniquely identifying the target machine, such as the target machine number. The operating state information includes identification information of the target machine. When determining that the target machine is down, the mobile terminal account of the person responsible for the target machine is determined according to the preset mapping relationship between the identification information of the target machine and the mobile terminal account of the responsible person, and the downtime prompt information is sent to the mobile terminal account, such that when the mobile terminal receives the prompt information, it is convenient for the person responsible for the target machine to check it.

Figure 5:
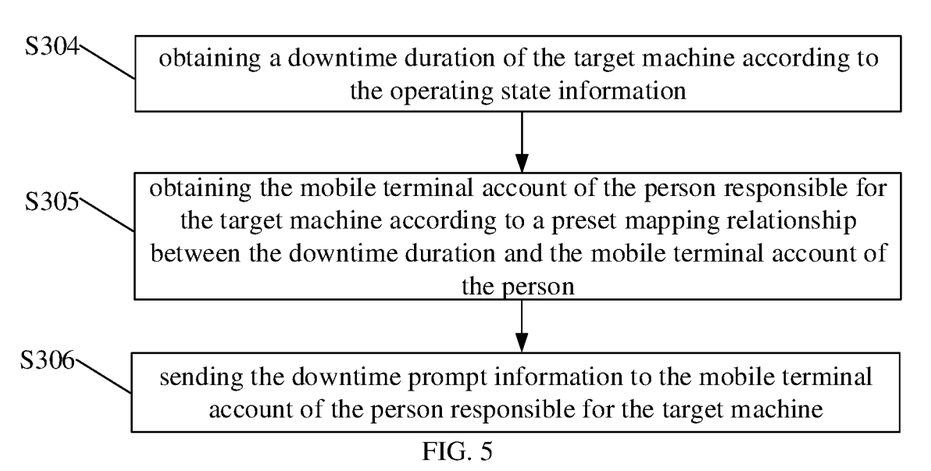
FIG. 5 is a detailed flowchart of operation S30 of the method for monitoring downtime of a target machine according to another embodiment of the present disclosure.

As shown in FIG. 5, in an embodiment, the operation S50 includes:

Operation S304, obtaining a downtime duration of the target machine according to the operating state information;

Operation S305, obtaining the mobile terminal account of the person responsible for the target machine according to a preset mapping relationship between the downtime duration and the mobile terminal account of the person; and Operation S306, sending the downtime prompt information to the mobile terminal account of the person responsible for the target machine.

In this embodiment, the downtime duration starts from the downtime of the target machine. The total duration of downtime continues to increase. The downtime prompt information is send to the person responsible for the target machine according to the time period of the downtime duration. For example, when the downtime duration is in the interval of 0-30 min, the first person directly responsible is notified, such as a supervisor of the target machine, the downtime prompt message is sent to the mobile terminal account of the first person directly responsible. When the downtime duration is in the interval of 30-60 min, the first person directly responsible and the second directly responsible person such as the superior minister of the supervisor of the target machine are notified, the downtime prompt message is sent to the mobile terminal accounts of the first person directly responsible and the second directly responsible person. When the downtime duration is in the interval of 60-1200 min, the first person directly responsible, the second directly responsible person and the third directly responsible person such as the higher-level factory director of the minister are notified, the downtime prompt message is sent to the mobile terminal accounts of the first person directly responsible, the second directly responsible person and the third directly responsible person. By analogy, that is, the greater the duration interval of the downtime, the higher the responsible person is notified, which is convenient for management, and convenient to take timely measures to avoid major losses.

Figure 6:
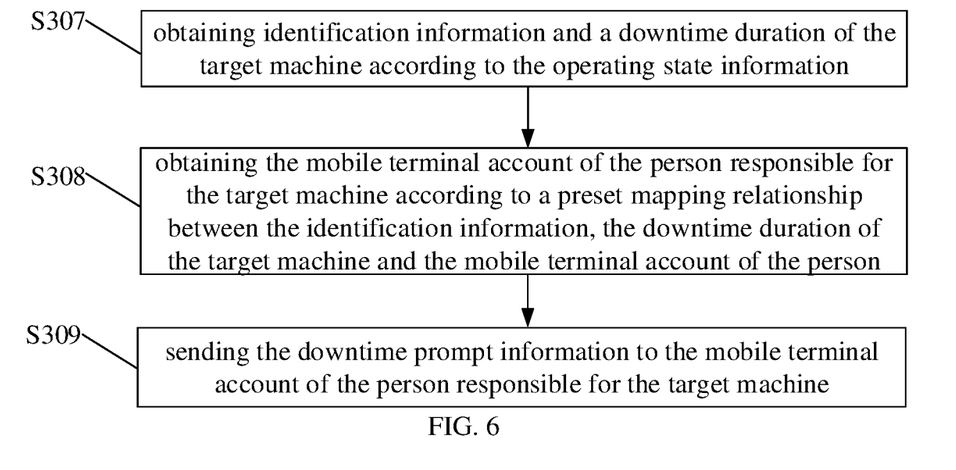
FIG. 6 is a detailed flowchart of operation S30 of the method for monitoring downtime of a target machine according to yet another embodiment of the present disclosure.

As shown in FIG. 6, in an embodiment, the operation S30 includes:

Operation S307, obtaining identification information and a downtime duration of the target machine according to the operating state information;

Operation S308, obtaining the mobile terminal account of the person responsible for the target machine according to a preset mapping relationship between the identification information, the downtime duration of the target machine and the mobile terminal account of the person; and Operation S309, sending the downtime prompt information to the mobile terminal account of the person responsible for the target machine.

In this embodiment, the person responsible for sending the downtime prompt information is determined according to the identification information and the downtime duration of the target machine, such that the downtime prompt information is sent to the person responsible for the target machine accurately. According to the downtime duration, that is, according to the severity of the downtime, the downtime prompt information is sent to the responsible persons of different positions, which is convenient for management, and convenient to take timely measures to avoid major losses.

Figure 7:
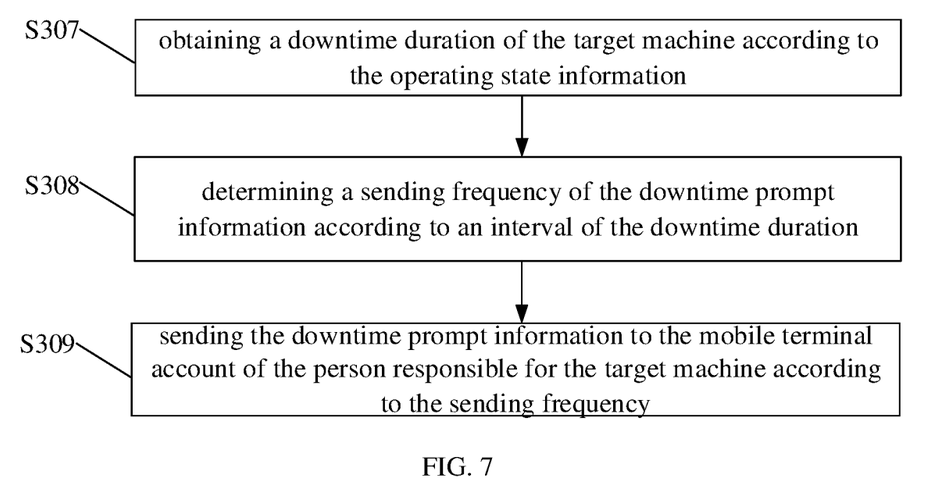
FIG. 7 is a detailed flowchart of operation S30 of the method for monitoring downtime of a target machine according to still another embodiment of the present disclosure.

As shown in FIG. 7, in an embodiment, the operation S30 includes:

Operation S310, obtaining a downtime duration of the target machine according to the operating state information;

Operation S311, determining a sending frequency of the downtime prompt information according to an interval of the downtime duration; and Operation S312, sending the downtime prompt information to the mobile terminal account of the person responsible for the target machine according to the sending frequency.

In this embodiment, the downtime duration starts from the downtime of the target machine. The total duration of downtime continues to increase. According to the duration interval of the downtime duration, the downtime prompt information will be sent to the person responsible for the target machine according to the sending frequency corresponding to the duration interval. For example, when the downtime duration is in the interval of 0-30 min, the downtime prompt information is sent to the mobile terminal account of the responsible person according to the first sending frequency, such as 10 min/time. When the downtime duration is in the interval of 30-60 min, the downtime prompt information is sent to the mobile terminal account of the responsible person according to the second sending frequency, such as 5 min/time. When the downtime duration is in the interval of 60-1200 min, the downtime prompt information is sent to the mobile terminal account of the responsible person according to the third sending frequency, such as 2 min/time. By analogy, that is, the greater the duration interval of the downtime, the higher the frequency of sending the downtime prompt information, so as to urge the responsible person to take timely measures to avoid major losses.

Figure 8:
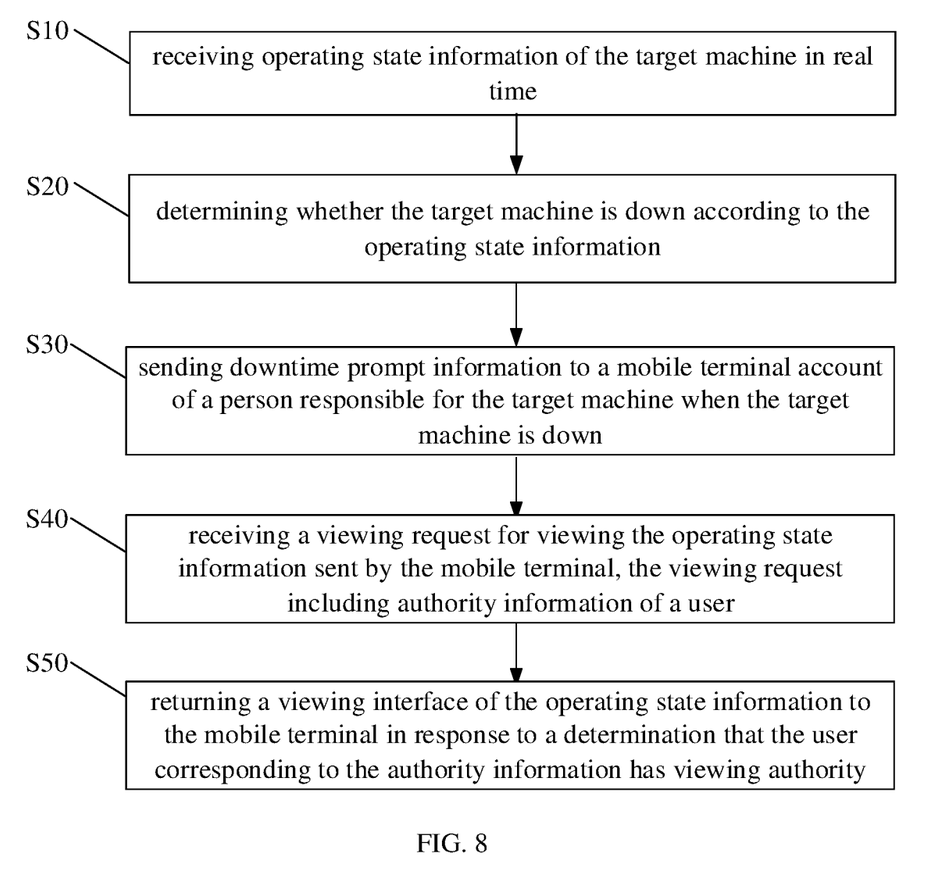
FIG. 8 is a schematic flowchart of the method for monitoring downtime of a target machine according to another embodiment of the present disclosure.

As shown in FIG. 8, in an embodiment, after the operation S30, the method further includes:

Operation S40, receiving a viewing request for viewing the operating state information sent by the mobile terminal, the viewing request including authority information of a user; and Operation S50, returning a viewing interface of the operating state information to the mobile terminal in response to a determination that the user corresponding to the authority information has viewing authority.

In this embodiment, only when it is determined that the user requesting to view has the viewing authority of the operating state information, the viewing interface of the operating state information will be returned to the mobile terminal. If a user without viewing authority is not the person responsible for the target machine, the operation information of the target machine cannot be viewed, which ensures the safety and concealment of the operating state information, and avoids that the unclear demarcation between the person responsible for the target machine and the rest of the users leads to unclear division of responsibilities.

Figure 9:
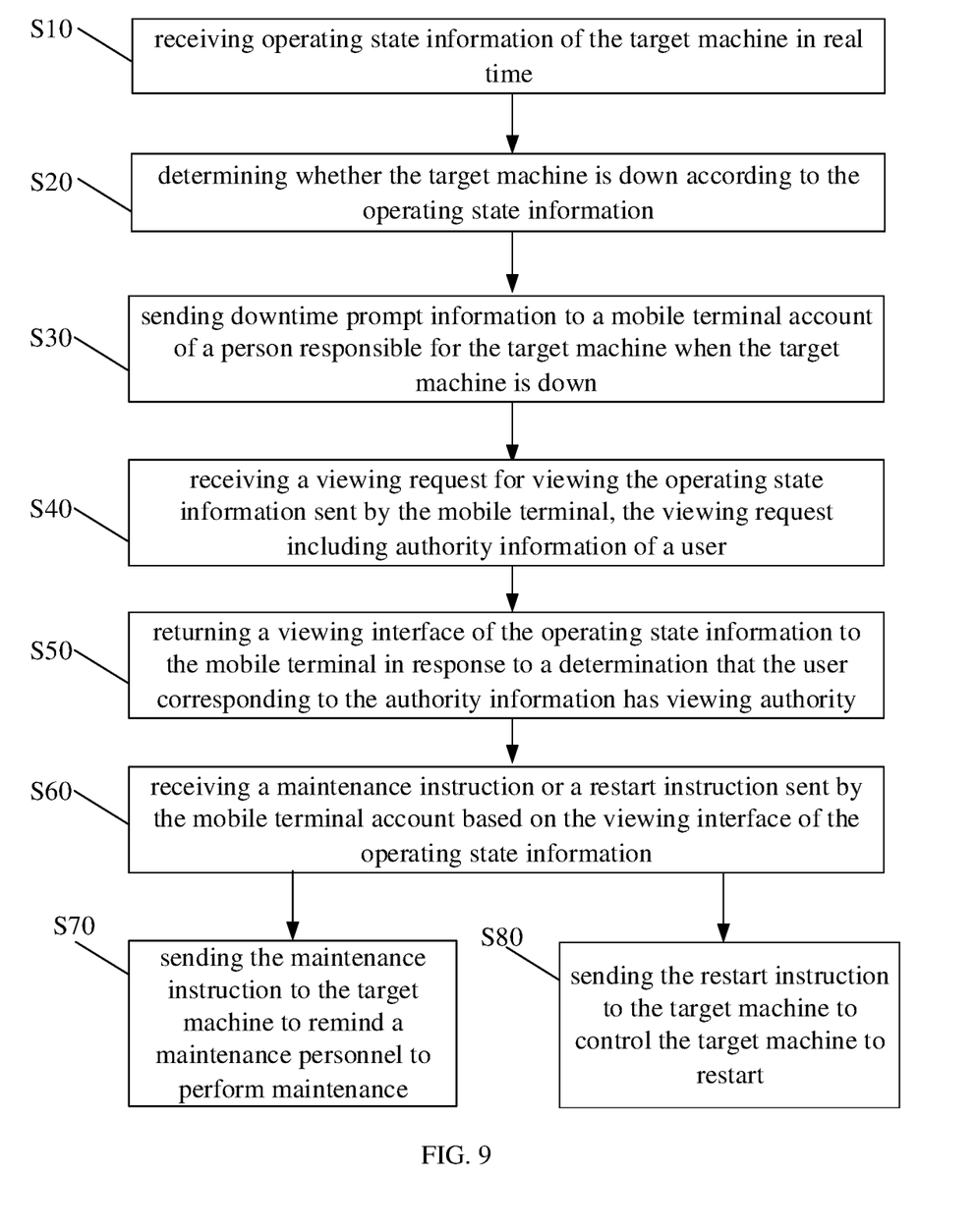
FIG. 9 is a schematic flowchart of the method for monitoring downtime of a target machine according to still another embodiment of the present disclosure.

As shown in FIG. 9, in an embodiment, after the operation S50, the method further includes:

Operation S60, receiving a maintenance instruction or a restart instruction sent by the mobile terminal account based on the viewing interface of the operating state information;

Operation S70, sending the maintenance instruction to the target machine to remind a maintenance personnel to perform maintenance; or Operation S80, sending the restart instruction to the target machine to control the target machine to restart.

In this embodiment, after knowing the down state of the corresponding target machine, the responsible person can view the maintenance instruction or restart instruction issued by the interface based on the operating state information displayed by the mobile terminal. When receiving the maintenance instruction, the server sends the maintenance instruction to a corresponding target machine or a monitoring terminal that monitors the target machine, so as to remind the maintenance personnel to perform maintenance in time. When receiving the restart instruction, the server sends the restart instruction to a corresponding target machine or a monitoring terminal that monitors the target machine to control the target machine to restart and resume production in time.

In another embodiment, the responsible person can issue a maintenance supervision instruction to remind the maintenance personnel to perform maintenance based on the viewing interface of the operating state information displayed by the mobile terminal. When receiving the maintenance supervision instruction, the server forwards the downtime prompt information and the maintenance supervision instruction to the mobile terminal account of the corresponding maintenance personnel, so as to urge the maintenance personnel to repair the target machine in time. After the maintenance is completed, the maintenance personnel can also issue a maintenance completion instruction through the viewing interface of the operating state information to inform the relevant responsible person that the maintenance is completed, thereby improving maintenance efficiency and information interaction efficiency.

Besides, in order to achieve the above objective, the present disclosure further provides a device for monitoring downtime of a target machine, including a memory, a processor, a program for monitoring downtime of a target machine stored in the memory and executed by the processor, the program, when executed by the processor, performs the operations of the method for monitoring downtime of the target machine described above.

Besides, in order to achieve the above objective, the present disclosure further provides a computer readable storage medium, the computer readable storage medium stores a program for monitoring downtime of a target machine, the program, when executed by a processor, performs the operations of the method for monitoring downtime of the target machine described above.

It should be noted that in this document, the terms "comprise", "include" or any other variants thereof are intended to cover a non-exclusive inclusion. Thus, a process, method, article, or system that includes a series of elements not only includes those elements, but also includes other elements that are not explicitly listed, or also includes elements inherent to the process, method, article, or system. If there are no more restrictions, the element defined by the sentence "including a . . . " does not exclude the existence of other identical elements in the process, method, article or system that includes the element.

The serial numbers of the foregoing embodiments of the present disclosure are only for description, and do not represent the advantages and disadvantages of the embodiments.

Through the description of the above embodiment, those skilled in the art can clearly understand that the above-mentioned embodiments can be implemented by software plus a necessary general hardware platform, of course, it can also be implemented by hardware, but in many cases the former is a better implementation. Based on this understanding, the technical solution of the present disclosure can be embodied in the form of software product in essence or the part that contributes to the existing technology. The computer software product is stored on a storage medium (such as ROM/RAM, magnetic disk, optical disk) as described above, including several instructions to cause a terminal device (which can be a mobile phone, a computer, a server, or a network device, etc.) to execute the method described in each embodiment of the present disclosure.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A method for monitoring downtime of a target machine, comprising the following operations:
   receiving operating state information of the target machine in real time;
   determining whether the target machine is down according to the operating state information;
   obtaining a downtime duration of the target machine according to the operating state information;
   obtaining a mobile terminal account of a person responsible for the target machine according to a preset mapping relationship between the downtime duration and the mobile terminal account of the person;
   sending downtime prompt information to the mobile terminal account of the person responsible for the target machine when the target machine is down according to an interval of the downtime duration;
   when the downtime duration is in the interval of a first duration to a second duration, sending the downtime prompt information to a first person responsible for the target machine;
   when the downtime duration is in the interval of the second duration to a third duration, sending the downtime prompt information to the first person and a second person responsible for the target machine; and
   when the downtime duration is in the interval of the third duration to a fourth duration, sending the downtime prompt information to the first person, the second person and a third person responsible for the target machine;
   wherein the first duration is shorter than the second duration, the second duration is shorter than the third duration, and the third duration is shorter than the fourth duration.

2. The method of claim 1, wherein the operation of determining whether the target machine is down according to the operating state information comprises:
   obtaining an operating power of the target machine according to the operating state information; and
   determining that the target machine is down when the operating power is beyond a preset range.

3. The method of claim 1, wherein the operation of sending downtime prompt information to the mobile terminal account of the person responsible for the target machine when the target machine is down comprises:
   obtaining identification information of the target machine according to the operating state information;
   obtaining the mobile terminal account of the person responsible for the target machine according to a preset mapping relationship between the identification information of the target machine and the mobile terminal account of the person; and
   sending the downtime prompt information to the mobile terminal account of the person responsible for the target machine.

4. The method of claim 1, wherein the operation of sending downtime prompt information to the mobile terminal account of the person responsible for the target machine when the target machine is down comprises:
   obtaining identification information and a downtime duration of the target machine according to the operating state information;
   obtaining the mobile terminal account of the person responsible for the target machine according to a preset mapping relationship between the identification information, the downtime duration of the target machine and the mobile terminal account of the person; and
   sending the downtime prompt information to the mobile terminal account of the person responsible for the target machine.

5. The method of claim 1, wherein the operation of sending downtime prompt information to the mobile terminal account of the person responsible for the target machine when the target machine is down comprises:
   obtaining a downtime duration of the target machine according to the operating state information;
   determining a sending frequency of the downtime prompt information according to an interval of the downtime duration; and
   sending the downtime prompt information to the mobile terminal account of the person responsible for the target machine according to the sending frequency.

6. The method of claim 1, wherein after the operation of sending downtime prompt information to the mobile terminal account of the person responsible for the target machine when the target machine is down, the method further comprises:
   receiving a viewing request for viewing the operating state information sent by the mobile terminal, the viewing request including authority information of a user; and
   returning a viewing interface of the operating state information to the mobile terminal in response to a determination that the user corresponding to the authority information has viewing authority.

7. The method of claim 6, wherein after the operation of returning a viewing interface of the operating state information to the mobile terminal in response to a determination that the user corresponding to the authority information has viewing authority, the method further comprises:
   receiving a maintenance instruction or a restart instruction sent by the mobile terminal account based on the viewing interface of the operating state information;
   sending the maintenance instruction to the target machine to remind a maintenance personnel to perform maintenance; or sending the restart instruction to the target machine to control the target machine to restart.

8. A device for monitoring downtime of a target machine, wherein the device comprises a memory, a processor, a program for monitoring downtime of the target machine stored in the memory and executed by the processor, the program, when executed by the processor, performs the following operations:
receiving operating state information of the target machine in real time;
determining whether the target machine is down according to the operating state information;
obtaining a downtime duration of the target machine according to the operating state information;
obtaining a mobile terminal account of a person responsible for the target machine according to a preset mapping relationship between the downtime duration and the mobile terminal account of the person;
sending downtime prompt information to the mobile terminal account of the person responsible for the target machine when the target machine is down according to an interval of the downtime duration;
when the downtime duration is in the interval of a first duration to a second duration, sending the downtime prompt information to a first person responsible for the target machine;
when the downtime duration is in the interval of the second duration to a third duration, sending the downtime prompt information to the first person and a second person responsible for the target machine; and
when the downtime duration is in the interval of the third duration to a fourth duration, sending the downtime prompt information to the first person, the second person and a third person responsible for the target machine;
wherein the first duration is shorter than the second duration, the second duration is shorter than the third duration, and the third duration is shorter than the fourth duration.

9. The device of claim 8, wherein the operation of determining whether the target machine is down according to the operating state information comprises:
obtaining an operating power of the target machine according to the operating state information; and
determining that the target machine is down when the operating power is beyond a preset range.

10. The device of claim 8, wherein the operation of sending downtime prompt information to the mobile terminal account of the person responsible for the target machine when the target machine is down comprises:
obtaining identification information of the target machine according to the operating state information;
obtaining the mobile terminal account of the person responsible for the target machine according to a preset mapping relationship between the identification information of the target machine and the mobile terminal account of the person; and
sending the downtime prompt information to the mobile terminal account of the person responsible for the target machine.

11. The device of claim 8, wherein the operation of sending downtime prompt information to the mobile terminal account of the person responsible for the target machine when the target machine is down comprises:
obtaining identification information and a downtime duration of the target machine according to the operating state information;
obtaining the mobile terminal account of the person responsible for the target machine according to a preset mapping relationship between the identification information, the downtime duration of the target machine and the mobile terminal account of the person; and
sending the downtime prompt information to the mobile terminal account of the person responsible for the target machine.

12. The method of claim 8, wherein the operation of sending downtime prompt information to the mobile terminal account of the person responsible for the target machine when the target machine is down comprises:
obtaining a downtime duration of the target machine according to the operating state information;
determining a sending frequency of the downtime prompt information according to an interval of the downtime duration; and
sending the downtime prompt information to the mobile terminal account of the person responsible for the target machine according to the sending frequency.

13. A non-transitory computer readable storage medium, wherein the non-transitory computer readable storage medium stores a program for monitoring downtime of a target machine, the program, when executed by a processor, performs the following operations:
receiving operating state information of the target machine in real time;
determining whether the target machine is down according to the operating state information;
obtaining a downtime duration of the target machine according to the operating state information;
obtaining a mobile terminal account of a person responsible for the target machine according to a preset mapping relationship between the downtime duration and the mobile terminal account of the person;
sending downtime prompt information to the mobile terminal account of the person responsible for the target machine when the target machine is down according to an interval of the downtime duration;
when the downtime duration is in the interval of a first duration to a second duration, sending the downtime prompt information to a first person responsible for the target machine;
when the downtime duration is in the interval of the second duration to a third duration, sending the downtime prompt information to the first person and a second person responsible for the target machine; and
when the downtime duration is in the interval of the third duration to a fourth duration, sending the downtime prompt information to the first person, the second person and a third person responsible for the target machine;
wherein the first duration is shorter than the second duration, the second duration is shorter than the third duration, and the third duration is shorter than the fourth duration.

14. The non-transitory computer readable storage medium of claim 13, wherein the operation of determining whether the target machine is down according to the operating state information comprises:
obtaining an operating power of the target machine according to the operating state information; and
determining that the target machine is down when the operating power is beyond a preset range.

15. The non-transitory computer readable storage medium of claim 13, wherein the operation of sending downtime prompt information to the mobile terminal account of the person responsible for the target machine when the target machine is down comprises:

obtaining identification information of the target machine according to the operating state information;

obtaining the mobile terminal account of the person responsible for the target machine according to a preset mapping relationship between the identification information of the target machine and the mobile terminal account of the person; and sending the downtime prompt information to the mobile terminal account of the person responsible for the target machine.

16. The non-transitory computer readable storage medium of claim 13, wherein the operation of sending downtime prompt information to the mobile terminal account of the person responsible for the target machine when the target machine is down comprises:

obtaining identification information and a downtime duration of the target machine according to the operating state information;

obtaining the mobile terminal account of the person responsible for the target machine according to a preset mapping relationship between the identification information, the downtime duration of the target machine and the mobile terminal account of the person; and sending the downtime prompt information to the mobile terminal account of the person responsible for the target machine.

17. The non-transitory computer readable storage medium of claim 13, wherein the operation of sending downtime prompt information to the mobile terminal account of the person responsible for the target machine when the target machine is down comprises:

obtaining a downtime duration of the target machine according to the operating state information;

determining a sending frequency of the downtime prompt information according to an interval of the downtime duration; and sending the downtime prompt information to the mobile terminal account of the person responsible for the target machine according to the sending frequency.

* * * * *